United States Patent
Minato et al.

(10) Patent No.: US 6,507,481 B2
(45) Date of Patent: Jan. 14, 2003

(54) ELECTRONIC COMPONENT

(75) Inventors: Koichiro Minato, Kyoto (JP); Hiroshi Kurimoto, Yamaguchi (JP); Junji Yamane, Yamaguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/038,767

(22) Filed: Jan. 8, 2002

(65) Prior Publication Data

US 2002/0139553 A1 Oct. 3, 2002

(30) Foreign Application Priority Data

Jan. 17, 2001 (JP) ......................... 2001-008491

(51) Int. Cl.[7] .................. H01G 9/08; H01G 35/00; C04B 35/52
(52) U.S. Cl. ................ 361/517; 361/518; 361/523; 361/528; 361/502; 361/511; 252/62.2; 29/25.03; 501/88; 501/92
(58) Field of Search .................. 361/517, 518, 361/519, 502, 503, 504, 523, 528, 511, 525, 530, 512, 533; 252/62.2; 29/25.03; 501/88, 92

(56) References Cited

U.S. PATENT DOCUMENTS

| | | | | |
|---|---|---|---|---|
| 5,880,926 A | * | 3/1999 | Nishino et al. | |
| 6,017,367 A | * | 1/2000 | Nakata | |
| 6,058,006 A | * | 2/2000 | Yoshioka et al. | |
| 6,052,273 A | * | 4/2000 | Inoue et al. | |
| 6,128,179 A | * | 10/2000 | Morokuma | |
| 6,307,735 B1 | * | 10/2001 | Saito et al. | |
| 6,349,028 B1 | * | 2/2002 | Komatsu | |
| 6,442,014 B1 | * | 8/2002 | Lin | |

* cited by examiner

*Primary Examiner*—Dean A. Reichard
*Assistant Examiner*—Nguyen Ha
(74) *Attorney, Agent, or Firm*—McDermott, Will & Emery

(57) ABSTRACT

The electronic component of the present invention includes a case having an opening, an electronic component element and electrolytic solution disposed in the case, and a sealing member disposed so as to seal the opening. The sealing member has elasticity and is formed of a cross-linked structure of compound. The compound contains butyl rubber polymer as main component, phenol-based additive, and silane-based additive. Accordingly, the sealing member is improved in air-tightness, and the volatilization of the electrolytic solution becomes lessened. Further, an electronic component having such sealing member ensures excellent mounting ability. As a result, it is possible to obtain an electronic component capable of assuring excellent reliability for a long period of time even in a high temperature atmosphere and under high-temperature high humidity conditions.

17 Claims, 2 Drawing Sheets

ELECTRONIC COMPONENT

FIELD OF THE INVENTION

The present invention relates to an electronic component used for various electronic apparatus, particularly to an electronic component comprising an electrolytic solution and electronic component element.

BACKGROUND OF THE INVENTION

As an electronic component comprising an electrolytic solution and an electronic component element, an example of an aluminum electrolytic capacitor will be described in the following.

A conventional aluminum electrolytic capacitor comprises an electrolytic solution for driving, a capacitor element, a metallic case, a sealing member, a positive electrode lead wire, a negative electrode lead wire, and a seating plate.

A capacitor element impregnated with an electrolytic solution for driving is stored in the metallic case. The sealing member has elasticity and seals the opening of the metallic case. Each of the positive electrode lead wire and the negative electrode lead wire is led out of the capacitor element.

In a conventional aluminum electrolytic capacitor having such configuration, the electrolytic solution for driving contains ethylene glycol as main solvent, and ammonium salt of organic acid added to the main solvent. As the sealing member, rubber made of styrene butadiene rubber or ethylene propylene rubber is used.

Further, in order to assure reliability over a wide range of temperatures, γ-butyrolactone is recently employed in place of ethylene glycol. Accordingly, since ammonium salt of organic acid, that is an electrolytic component conventionally employed, is low in electric conductivity of the electrolytic solution for driving, quaternary ammonium salt of organic acid has become to be used in place of ammonium salt of organic acid conventionally employed.

Also, the change of such electrolytic solution for driving is giving rise to the use of isobutylene, isobutylene rubber (that is, butyl rubber) having excellent air-tightness as the sealing member.

However, in the case of a conventional electrolytic capacitor obtained by combining a sealing member formed of butyl rubber having excellent air-tightness with an electrolytic solution for driving using quaternary ammonium salt of organic acid as electrolyte, the electrolytic solution for driving causes bad influences to the sealing member when subjected to a life test at high temperatures or under high-temperature high-humidity conditions, resulting in lowering of air-tightness of the sealing member. Consequently, the electrolytic solution for driving stored together with the capacitor element is volatilized in the metallic case. Further, in a reflow test using solder containing no lead, conducted on a conventional electrolytic capacitor, the sealing member is deformed and, resulting in generation of mounting trouble.

A conventional electronic component comprising an electronic component element having an electrolytic solution for driving involves such problems as lowering of air-tightness and generation of mounting trouble.

The present invention is intended to provide an electronic component having excellent reliability which is able to prevent lowering of air-tightness of the sealing member and also generation of mounting trouble.

SUMMARY OF THE INVENTION

An electronic component of the present invention comprises:
- a case having an opening;
- an electronic component element installed in the case;
- an electrolytic solution disposed in the case;
- and a sealing member disposed to seal the opening of the case,
- wherein the sealing member has elasticity and comprises a cross-linked structure of compound, and the compound contains butyl rubber polymer as main component, phenol-based additive, and silane-based additive.

By this configuration, the sealing member will be improved in air-tightness. Further, the electrolytic solution is prevented from evaporating and leaking out of the case. Also, generation of mounting trouble may be prevented when the electronic component is actually mounted on a wiring board. Thus, it is possible to obtain an electronic component having excellent reliability.

DESCRIPTION OF THE REFERENCE NUMERALS

Figure 1:
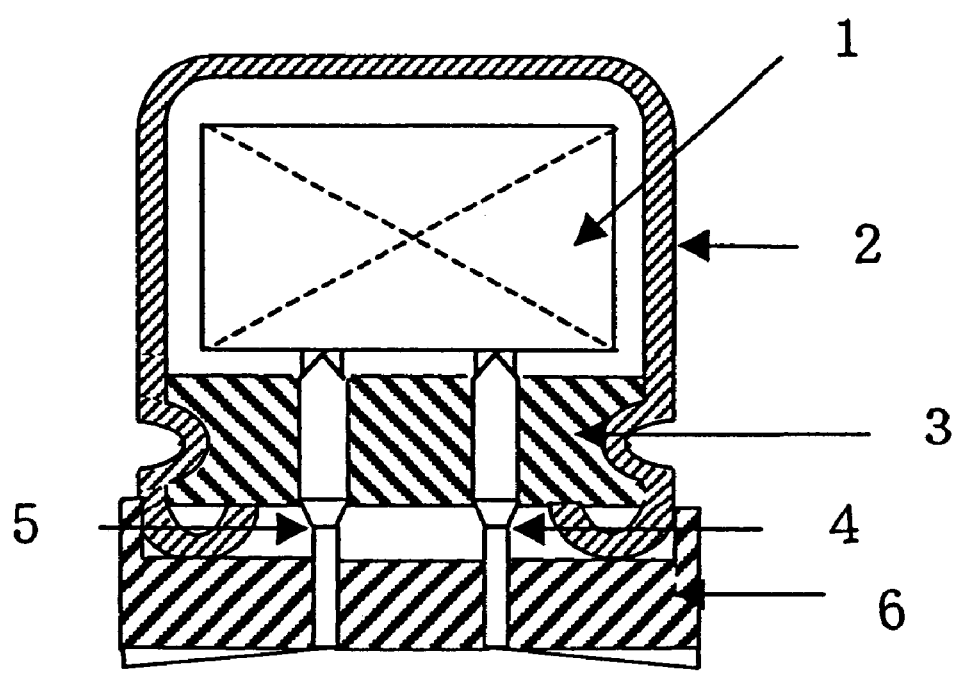
FIG. 1 is a sectional view showing the configuration of an aluminum electrolytic capacitor as an electronic component in one embodiment of the present invention.

1 Capacitor element
2 Metallic case
3 Sealing member
4 Positive electrode lead wire
5 Negative electrode lead wire
6 Seating plate

DETAILED DESCRIPTION OF THE INVENTION

An electronic component in one embodiment of the present invention comprises:
- a case having an opening;
- an electronic component element installed in the case;
- an electrolytic solution disposed in the case;
- and a sealing member disposed so as to seal the opening of the case,
- wherein the sealing member has elasticity and comprises a cross-linked structure of compound, and the compound contains butyl rubber polymer as main component, phenol-based additive, and silane-based additive.

In the above configuration, particularly, the compound contains phenol-based additive, therefore deterioration due to oxidation of the cross-linked structure and lowering of air-tightness of the sealing member maybe suppressed. Further, silane-based additive contained increases the cross-linking density of the cross-linked structure and improves the sealing power of the sealing member as well as the moisture resistance. Further, generation of mounting trouble may be prevented when the electronic component is actually mounted on a wiring board. As a result, even in a life test at high temperatures and under high-temperature high humidity conditions, the sealing member is free from bad influences of the electrolytic solution, and is prevented from lowering in air-tightness, making it possible to obtain a highly reliable electronic component even under high-temperature high humidity conditions. In addition, even in a reflow mounting with use of solder containing no lead, generation of mounting trouble may be prevented. In this way, the sealing member is prevented from lowering in air-tightness, and the air-tightness of the sealing member is improved. Further, the electrolytic solution is prevented from evaporating and leaking out of the case. Also, generation of mounting trouble may be prevented when the electronic component is actually mounted on a wiring board. Thus, it is possible to obtain an electronic component having excellent reliability.

Preferably, the case is a metallic case that is cylindrical having a bottom. Thus, the above effect will be further improved.

Preferably, the phenol-based additive contains at least either one of phenol class and phenol derivative.

The phenol class has substituents bonded to at least one of ortho position (o-),meta position (m-) and para position (p-) of phenol in the chemical structure. Each substituent has at least one of alkyl group, hydroxyl group and sulfhydryl group.

The phenol derivative includes a plurality of phenol groups and intermediate groups connected between the respective phenol groups.

The intermediate group has at least one of carbon, sulfur and alkyl group, and each phenol group has the similar chemical structure to the phenol class.

Accordingly, the effect of suppressing the deterioration due to oxidation of the cross-linked structure is further enhanced, and as a result, lowering of the air-tightness of the sealing member will be suppressed.

Preferably, the silane-based additive contains an organic silicon compound monomer, and the organic silicon compound has a chemical structure including silicon, and organic group and hydrolysis group connected to the silicon. The organic group includes at least one selected from the group consisting of carbon, nitrogen, oxygen, sulfur and hydrogen. The hydrolysis group includes at least one selected from the group consisting of carbon, hydrogen, and chlorine.

Accordingly, the effect of increasing the cross-linking density of the cross-linked structure will be further enhanced, and as a result, the sealing member will be further improved in sealing ability and in moisture resistance.

Preferably, the phenol-based additive contained is 0.5 part by weight or over against 100 part by weight of the butyl rubber polymer.

Thus, the effect described above will be further enhanced. In case the content of phenol-based additive is less than 0.5 part by weight, the effect will be slightly decreased.

Preferably, the silane-based additive contained is 0.1 part by weight or over against 100 part by weight of the butyl rubber polymer.

Thus, the effect described above will be further enhanced. In case the content of phenol-based additive is less than 0.1 part by weight, the effect will be slightly decreased.

Preferably, the solvent contains at least one selected from the group consisting of ethylene glycol, γ-butyrolactone, propylene carbonate, sulfolane, and water.

The electrolyte contains at least one electrolyte salt out of organic acid and inorganic acid. The electrolyte salt contains at least one selected from the group consisting of ammonium salt, primary to quaternary ammonium salt, imidazolium salt, imidazolium, and their derivatives.

Accordingly, in the combination of electrolytic solution and sealing member, the electrolytic solution may be prevented from giving bad influences to the sealing member. Consequently, in the life test conducted on the electronic component at high temperatures and under high-temperature high humidity conditions, worsening of the air-tightness of the sealing member is suppressed. As a result, the electronic component will be further improved in reliability.

Preferably, the compound further contains peroxide compound as across-linking catalyst. The butyl rubber polymer is cross-linked by the action of the peroxide compound. Thus, the above effect will be further enhanced.

Preferably, the compound further contains a cross-linking polymer that can be bridged to the butyl rubber polymer. The cross-linking polymer and the butyl rubber polymer are bridged to each other. Thus, the above effect will be further enhanced.

Preferably, the sealing member has elastic modulus of $4N/mm^2$ or over in the range of 240° C. to 270° C. Thus, the above effect will be further enhanced.

Preferably, the electronic component element includes an aluminum capacitor element, and the electronic component is an aluminum electrolytic capacitor. Accordingly, it is possible to obtain an aluminum electrolytic capacitor ensuring excellent effects as described above.

Preferably, the electrolytic capacitor comprises an insulation member located between the inner bottom of metallic case and the capacitor element. By this configuration, it is possible to prevent short-circuiting that may otherwise take place when the positive electrode foil and negative electrode foil come into contact with the metallic case.

Preferably, the aluminum electrolytic capacitor is a chip type surface-mounted aluminum electrolytic capacitor. Thus, it is possible to obtain a surface-mounted aluminum electrolytic capacitor which assures excellent effects as mentioned above.

An electrolytic capacitor in the exemplary embodiment of an electronic component of the present invention will be described in the following.

FIG. 1 is a sectional view showing the configuration of an aluminum electrolytic capacitor as an electronic component in the exemplary embodiment of the present invention. In FIG. 1, the aluminum electrolytic capacitor comprises a capacitor element 1, electrolytic solution for driving (not shown), metallic case 2, sealing member 3, positive electrode lead wire 4, and negative electrode lead wire 5.

The capacitor element 1 has aluminum electrode foil wound thereon via a separator. The aluminum electrode foil is used as positive electrode foil and negative electrode foil. The aluminum electrode foil has an oxide film surface. That is, an oxide film is formed by electrolytic oxidation after roughening of the aluminum surface. The capacitor element is formed by winding the positive electrode foil and negative electrode foil thereon with a separator disposed between the electrodes.

The capacitor element 1 and the electrolytic solution for driving are stored in the metallic case 2. The sealing member 3 has elasticity and serves to seal the opening of the metallic case 2. Each of the positive electrode lead wire 4 and negative electrode lead wire 5 is electrically connected to the capacitor element 1 and is led externally. The sealing member 3 has through-holes through which the positive electrode lead wire 4 and negative electrode lead wire 5 are passed respectively. While the positive electrode lead wire 4 and negative electrode lead wire 5 are respectively passed through the through-holes, the sealing member 3 is inserted into the opening of the metallic case 2. After that, the metallic case 2 is bent inwardly at the opening, pressurizing the sealing member 3, and then the metallic case 2 is peripherally reduced to dispose the sealing member 3 in the opening of the metallic case 2. In this case, utilizing the elasticity of the sealing member 3, the opening of the metallic case 2 is sealed by the sealing member 3. After that, the lead wires 4 and 5 externally led are passed through the through-holes in the sealing plate 6. And, the externally led portions of the lead wires 4 and 5 are flattened and bent along the seating plate. The aluminum electrolytic capacitor is configured in this way. The sealing member has elasticity and comprises a cross-linked structure of compound, and the compound contains butyl rubber polymer as main component, phenol-based additive, and silane-based additive.

Figure 2:
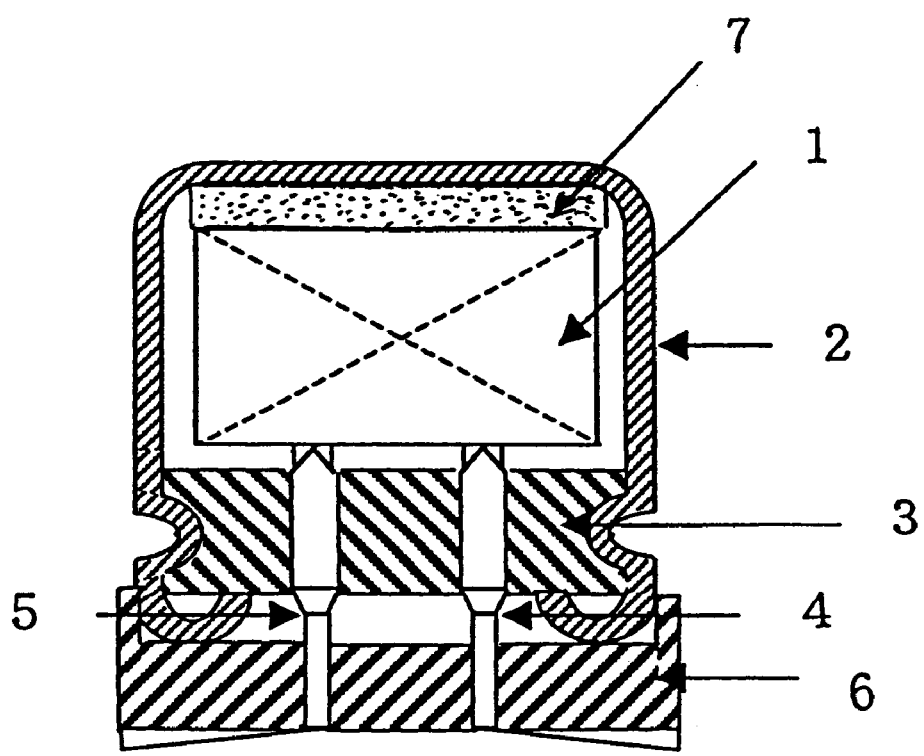
FIG. 2 is a sectional view showing the configuration of an aluminum electrolytic capacitor as an electronic component in another embodiment of the present invention.

FIG. 2 is a sectional view of an electronic compound in another exemplary embodiment of the present invention. An electrolytic capacitor is shown in FIG. 2 as an example of an electronic component. In FIG. 2, the electrolytic capacitor as an electronic component comprises a metallic case 2 having an inner bottom and opening; capacitor element 1 as an electronic component element disposed in the metallic case 2; electrolytic solution disposed in the case; sealing member 3 disposed to seal the opening; and insulating paper 7 as an insulating member disposed between the inner bottom and the capacitor element 1. Positive electrode lead wire 4 and negative electrode lead wire 5 are connected to the capacitor element 1 and passed through the sealing member 3. Seating plate 6 is disposed in a position opposite to the sealing member. The positive electrode lead wire 4 and negative electrode lead wire 5 are going through the seating plate 6, and the ends of the lead wires are positioned on the same side of the capacitor. The sealing member has elasticity and is formed of a cross-linked structure of compound, and the compound contains butyl rubber polymer as main component, phenol-based additive and silane-based additive. Since the insulating paper 7 is positioned between the inner bottom of metallic case and the capacitor element 1, short-circuiting trouble is prevented, which may otherwise take place when the positive electrode foil and negative electrode foil come into contact with the metallic case. Further, in a life test at high temperatures and under high-temperature high-humidity conditions, an electrolytic capacitor having excellent reliability may be obtained. Non-woven fabric made from Manila hemp, craft paper or organic polymer material, non-woven fabric of glass fiber, and non-woven fabric made from inorganic material are used as insulating paper 7. Manila hemp and craft paper are so-called electrolytic paper. Polyethylene resin is, for example, used as organic polymer material.

An aluminum electrolytic capacitor thus formed is a chip type surface-mounted aluminum electrolytic capacitor.

There is no particular limitation on the electrolytic solution for driving which is used for the aluminum electrolytic capacitor in the present exemplary embodiment, but the electrolytic solution contains, for example, a solvent and electrolyte. The solvent contains at least one selected from the group consisting of ethylene glycol, γ-butyrolactone, propylene carbonate, sulfolane and water. The electrolyte contains at least either one of organic. acid and inorganic acid. The electrolyte salt contains at least one selected from the group consisting of ammonium salt, primary to quaternary ammonium salt, imidazolium salt, imidazolium, and their derivatives.

In such aluminum electrolytic capacitor, the embodiments will be specifically described in the following with respect to the sealing member used in the electronic component of the present invention.

Embodiment 1

The sealing member is formed of a cross-linked structure of compound. The compound contains butyl rubber polymer, phenol-based additive, and silane-based additive. Butyl rubber polymer of the compound is chemically structurally cross-linked to produce a cross-linked structure having elasticity. For example, when the compound is heated, butyl rubber polymer is chemically cross-linked, thereby producing a cross-linked structure as a sealing member. The cross-linked structure as a sealing member has elasticity.

For example, the compound further contains peroxide compound as cross-linking catalyst, and by the action of the peroxide compound, butyl polymer is chemically cross-linked to produce a cross-linked structure.

The compound may further contain carbon powder or inorganic powder. As inorganic powder, optional powders such as silica powder and calcium carbonate powder are used. Containing these powders, the sealing member is improved in mechanical strength.

The phenol-based additive includes at least either one of phenol class and phenol derivative. Preferably, the compound contains 100 part by weight of butyl rubber polymer as main component, 0.5 part by weight of phenol-based additive, and 0.1 part by weight of silane-based additive.

Phenol class includes substituents connected to at least one of phenol's ortho position (o-), meta position (m-), and para position (p-). Each substituent has at least one of alkyl group, hydroxyl group, and sulfhydryl group.

Phenol derivative includes a plurality of phenol groups, intermediate groups respectively bonded between the plurality of phenol groups. The intermediate group has at least one out of carbon, sulfur and alkyl group. Each phenol group has the similar chemical structure to the phenol class.

Silane-based additive contains organic silicon compound monomer. The organic silicon compound has a chemical structure that includes silicon, organic group bonded to the silicon, and hydrolysis group. The organic group includes at least one selected from the group consisting of carbon, nitrogen, oxygen, sulfur and nitrogen. The hydrolysis group includes at least one selected from the group consisting of carbon, hydrogen and chlorine.

Embodiment 2

The compound of the sealing member in the present embodiment contains 100 part by weight of butyl rubber polymer, 0.8 part by weight of phenol-based additive, and 0.1 part by weight of silane-base additive. The phenol-based additive contains phenol class and phenol derivatives. By cross-linking the compound, a cross-linked structure is formed as sealing member. The sealing member has elasticity.

Embodiment 3

The compound of the sealing member in the present embodiment contains 100 part by weight of butyl rubber polymer, 1.0 part by weight of phenol-based additive, and 0.1 part by weight of silane-base additive. The phenol-based additive contains phenol class and phenol derivatives. By cross-linking the compound, a cross-linked structure is formed as sealing member. The sealing member has elasticity.

Embodiment 4

The compound of the sealing member in the present embodiment contains 100 part by weight of butyl rubber polymer, 5.0 part by weight of phenol-based additive, and 0.1 part by weight of silane-base additive. The phenol-based additive contains phenol class and phenol derivatives. By cross-linking the compound, a cross-linked structure is formed as sealing member. The sealing member has elasticity.

Embodiment 5

The compound of the sealing member in the present embodiment contains 100 part by weight of butyl rubber polymer, 10.0 part by weight of phenol-based additive, and 0.1 part by weight of silane-base additive. The phenol-based additive contains phenol class and phenol derivatives. By cross-linking the compound, a cross-linked structure is formed as sealing member. The sealing member has elasticity.

Embodiment 6

The compound of the sealing member in the present embodiment contains 100 part by weight of butyl rubber polymer, 0.5 part by weight of phenol-based additive, and 0.3 part by weight of silane-base additive. The phenol-based additive contains phenol class and phenol derivatives. By cross-linking the compound, a cross-linked structure is formed as sealing member. The sealing member has elasticity.

Embodiment 7

The compound of the sealing member in the present embodiment contains 100 part by weight of butyl rubber polymer, 0.5 part by weight of phenol-based additive, and 0.5 part by weight of silane-base additive. The phenol-based additive contains phenol class and phenol derivatives. By cross-linking the compound, a cross-linked structure is formed as sealing member. The sealing member has elasticity.

Embodiment 8

The compound of the sealing member in the present embodiment contains 100 part by weight of butyl rubber polymer, 0.5 part by weight of phenol-based additive, and 1.0 part by weight of silane-base additive. The phenol-based additive contains phenol class and phenol derivatives. By cross-linking the compound, a cross-linked structure is formed as sealing member. The sealing member has elasticity.

Embodiment 9

The compound of the sealing member in the present embodiment contains 100 part by weight of butyl rubber polymer, 0.5 part by weight of phenol-based additive, and 5.0 part by weight of silane-base additive. The phenol-based additive contains phenol class and phenol derivatives. By cross-linking the compound, a cross-linked structure is formed as sealing member. The sealing member has elasticity.

Embodiment 10

The compound of the sealing member in the present embodiment contains 100 part by weight of butyl rubber polymer, 0.5 part by weight of phenol-based additive, and 10.0 part by weight of silane-base additive. The phenol-based additive contains phenol class and phenol derivatives. By cross-linking the compound, a cross-linked structure is formed as sealing member. The sealing member has elasticity.

Embodiment 11

The compound of the sealing member in the present embodiment contains 100 part by weight of butyl rubber polymer, 0.3 part by weight of phenol-based additive, and 0.1 part by weight of silane-base additive. The phenol-based additive contains phenol class and phenol derivatives. By cross-linking the compound, a cross-linked structure is formed as sealing member. The sealing member has elasticity.

Embodiment 12

The compound of the sealing member in the present embodiment contains 100 part by weight of butyl rubber polymer, 0.5 part by weight of phenol-based additive, and 0.05 part by weight of silane-base additive. The phenol-based additive contains phenol class and phenol derivatives. By cross-linking the compound, a cross-linked structure is formed as sealing member. The sealing member has elasticity.

Comparative Example

The compound of the sealing member in the comparative example contains 100 part by weight of butyl rubber polymer, but it does not contain phenol-based additive nor silane-based additive. By cross-linking the compound, a cross-linked structure is formed as sealing member.

Air-tightness Evaluation Test of Electronic Component

Various aluminum electrolytic capacitors as shown in FIG. 1 were manufactured by using each of the sealing members obtained in the above embodiments 1 to 12 and in the comparative

Example 1

The aluminum electrolytic capacitors, 20 pieces each, were placed in a high-temperature atmosphere at 105° C. for specific lengths of time (1,000 hours, 2,000 hours, 3,000 hours, 5,000 hours). Then, the number of defectives was measured with respect to air-tightness against time. The results of the high-temperature tests are shown in Table 1.

The aluminum electrolytic capacitors, 20 pieces each, were placed in a high-temperature high-humidity atmosphere at 85° C., 85%RH for specific lengths of time (1,000 hours, 2,000 hours, 3,000 hours, 5,000 hours). Then, the number of defectives was measured with respect to air-tightness against time. The results of the high-temperature high-humidity tests are shown in Table 2.

The aluminum electrolytic capacitors, 20 pieces each, were subjected to a reflow test in which the capacitors are mounted on a wiring board by reflow soldering without using lead. Each of the electrolytic capacitors was mounted on the board by reflow soldering with the peak temperature changed to 240° C., 250° C., 260° C., and 270° C. Then, the number of defectives was measured with respect to air-tightness against each peak temperature. The results of the reflow tests are shown in Table 3. The reflow peak temperature means the highest temperature during reflow soldering.

As for each of the sealing members obtained in the above embodiments 1 to 12 and in the comparative example 1, the elastic modulus was measured at each temperature of 240°

C., 250° C., 260° C. and 270° C. The results of high temperature tests for elastic modulus of cross-linked structure used as sealing member are shown in Table 4. In Table 4, the unit of elastic modulus is N/mm².

TABLE 1

High temperature test:
Air-tightness test results of a sealing member at 105° C.
In the table, the denominator shows the test sample, and the numerator shows the number of defectives with respect to air-tightness.

| | Additives | | Number of defectives in each length of time | | | |
|---|---|---|---|---|---|---|
| | Phenol-based additive | Silane-based additive | 1,000 hours | 2,000 hours | 3,000 hours | 5,000 hours |
| Embodiment 1 | 0.5 part by weight | 0.1 part by weight | 0/20 | 0/20 | 0/20 | 0/20 |
| Embodiment 2 | 0.8 part by weight | 0.1 part by weight | 0/20 | 0/20 | 0/20 | 0/20 |
| Embodiment 3 | 1.0 part by weight | 0.1 part by weight | 0/20 | 0/20 | 0/20 | 0/20 |
| Embodiment 4 | 5.0 part by weight | 0.1 part by weight | 0/20 | 0/20 | 0/20 | 0/20 |
| Embodiment 5 | 10.0 part by weight | 0.1 part by weight | 0/20 | 0/20 | 0/20 | 0/20 |
| Embodiment 6 | 0.5 part by weight | 0.3 part by weight | 0/20 | 0/20 | 0/20 | 0/20 |
| Embodiment 7 | 0.5 part by weight | 0.5 part by weight | 0/20 | 0/20 | 0/20 | 0/20 |
| Embodiment 8 | 0.5 part by weight | 1.0 part by weight | 0/20 | 0/20 | 0/20 | 0/20 |
| Embodiment 9 | 0.5 part by weight | 5.0 part by weight | 0/20 | 0/20 | 0/20 | 0/20 |
| Embodiment 10 | 0.5 part by weight | 10.0 part by weight | 0/20 | 0/20 | 0/20 | 0/20 |
| Embodiment 11 | 0.3 part by weight | 0.1 part by weight | 0/20 | 0/20 | 6/20 | 12/20 |
| Embodiment 12 | 0.5 part by weight | 0.05 part weight | 0/20 | 0/20 | 5/20 | 13/20 |
| Comparative example | 0 part by weight | 0 part by weight | 0/20 | 3/20 | 12/20 | 17/20 |

TABLE 2

High-temperature high-humidity test:
Air-tightness test results of a sealing member at 85° C., 85% RH.
In the table, the denominator shows the test sample, and the numerator shows the number of defectives with respect to air tightness.

| | Additives | | Number of defectives in each length of time | | | |
|---|---|---|---|---|---|---|
| | Phenol-based additive | Silane-based additive | 1,000 hours | 2,000 hours | 3,000 hours | 5,000 hours |
| Embodiment 1 | 0.5 part by weight | 0.1 part by weight | 0/20 | 0/20 | 0/20 | 0/20 |
| Embodiment 2 | 0.8 part by weight | 0.1 part by weight | 0/20 | 0/20 | 0/20 | 0/20 |
| Embodiment 3 | 1.0 part by weight | 0.1 part by weight | 0/20 | 0/20 | 0/20 | 0/20 |
| Embodiment 4 | 5.0 part by weight | 0.1 part by weight | 0/20 | 0/20 | 0/20 | 0/20 |
| Embodiment 5 | 10.0 part by weight | 0.1 part by weight | 0/20 | 0/20 | 0/20 | 0/20 |
| Embodiment 6 | 0.5 part by weight | 0.3 part by weight | 0/20 | 0/20 | 0/20 | 0/20 |
| Embodiment 7 | 0.5 part by weight | 0.5 part by weight | 0/20 | 0/20 | 0/20 | 0/20 |
| Embodiment 8 | 0.5 part by weight | 1.0 part by weight | 0/20 | 0/20 | 0/20 | 0/20 |
| Embodiment 9 | 0.5 part by weight | 5.0 part by weight | 0/20 | 0/20 | 0/20 | 0/20 |
| Embodiment 10 | 0.5 part by weight | 10.0 part by weight | 0/20 | 0/20 | 0/20 | 0/20 |
| Embodiment 11 | 0.3 part by weight | 0.1 part by weight | 0/20 | 2/20 | 12/20 | 18/20 |
| Embodiment 12 | 0.5 part by weight | 0.05 part by weight | 0/20 | 3/20 | 13/20 | 17/20 |
| Comparative example | 0 part by weight | 0 part by weight | 0/20 | 8/20 | 18/20 | 20/20 |

TABLE 3

Reflow test results using solder without lead
In the table, the denominator shows the test sample, and the numerator shows the number of defectives with respect to air-tightness.

| | Additives | | Peak at 240° | Peak at 250° | Peak at 260° | Peak at 270° |
|---|---|---|---|---|---|---|
| | Phenol-based additive | Silane-based additive | | | | |
| Embodiment 1 | 0.5 part by weight | 0.1 part by weight | 0/20 | 0/20 | 0/20 | 0/20 |
| Embodiment 2 | 0.8 part by weight | 0.1 part by weight | 0/20 | 0/20 | 0/20 | 0/20 |
| Embodiment 3 | 1.0 part by weight | 0.1 part by weight | 0/20 | 0/20 | 0/20 | 0/20 |
| Embodiment 4 | 5.0 part by weight | 0.1 part by weight | 0/20 | 0/20 | 0/20 | 0/20 |
| Embodiment 5 | 10.0 part by weight | 0.1 part by weight | 0/20 | 0/20 | 0/20 | 0/20 |
| Embodiment 6 | 0.5 part by weight | 0.3 part by weight | 0/20 | 0/20 | 0/20 | 0/20 |
| Embodiment 7 | 0.5 part by weight | 0.5 part by weight | 0/20 | 0/20 | 0/20 | 0/20 |
| Embodiment 8 | 0.5 part by weight | 1.0 part by weight | 0/20 | 0/20 | 0/20 | 0/20 |
| Embodiment 9 | 0.5 part by weight | 5.0 part by weight | 0/20 | 0/20 | 0/20 | 0/20 |
| Embodiment 10 | 0.5 part by weight | 10.0 part by weight | 0/20 | 0/20 | 0/20 | 0/20 |
| Embodiment 11 | 0.3 part by weight | 0.1 part by weight | 0/20 | 0/20 | 0/20 | 0/20 |
| Embodiment 12 | 0.5 part by weight | 0.05 part by weight | 0/20 | 0/20 | 5/20 | 20/20 |
| Comparative example | 0 part by weight | 0 part by weight | 0/20 | 5/20 | 15/20 | 20/20 |

TABLE 4

High temperature elasticity test results of rubber
material used for a sealing member
In the table, the elasticity is (N/mm²).

| Additives | | Elasticity in each degree of temperature (N/mm²) | | | |
|---|---|---|---|---|---|
| Phenol-based additive | Silane-based additive | Test at 240° | Test at 250° | Test at 260° | Test at 270° |
| Embodiment 1 | 0.5 part by weight | 0.1 part by weight | 4.60 | 4.40 | 4.20 | 4.10 |
| Embodiment 2 | 0.8 part by weight | 0.1 part by weight | 4.60 | 4.40 | 4.20 | 4.10 |
| Embodiment 3 | 1.0 part by weight | 0.1 part by weight | 4.60 | 4.40 | 4.20 | 4.10 |
| Embodiment 4 | 5.0 part by weight | 0.1 part by weight | 4.55 | 4.35 | 4.15 | 4.05 |
| Embodiment 5 | 10.0 part by weight | 0.1 part by weight | 4.60 | 4.40 | 4.20 | 4.10 |
| Embodiment 6 | 0.5 part by weight | 0.3 part by weight | 4.80 | 4.65 | 4.45 | 4.30 |
| Embodiment 7 | 0.5 part by weight | 0.5 part by weight | 4.90 | 4.75 | 4.50 | 4.35 |
| Embodiment 8 | 0.5 part by weight | 1.0 part by weight | 5.20 | 5.00 | 4.85 | 4.65 |
| Embodiment 9 | 0.5 part by weight | 5.0 part by weight | 5.50 | 5.30 | 5.00 | 4.85 |
| Embodiment 10 | 0.5 part by weight | 10.0 part by weight | 6.00 | 5.85 | 5.60 | 5.20 |
| Embodiment 11 | 0.3 part by weight | 0.1 part by weight | 4.60 | 4.40 | 4.20 | 4.10 |
| Embodiment 12 | 0.5 part by weight | 0.05 part by weight | 4.30 | 4.15 | 3.90 | 3.75 |
| Comparative example | 0 part by weight | 0 part by weight | 4.20 | 3.90 | 3.80 | 3.70 |

In the high temperature (105° C.) test results of Table 1 and the high-temperature high-humidity (85° C., 85%RH) test results of Table 2, the electrolytic capacitors using a sealing member containing 0.5 part by weight or over of phenol-based additive and 0.1 part by weight or over of silane-based additive (Embodiments 1 to 10) showed no generation of defective air-tightness even after lapse of 5,000 hours. Also, the electrolytic capacitors using a sealing member containing 0.3 part by weight or less of phenol-based additive and 0.1 part by weight or less of silane-based additive (Embodiments 11 and 12) increased in the number of defectives with respective to air-tightness with the lapse of time. Further, the electrolytic capacitors using a sealing member containing no phenol-based additive nor silane-based additive more increased in the number of defectives with respect to air-tightness with the lapse of time.

In the reflow soldering test results of Table 3, the electrolytic capacitors using a sealing member containing 0.3 part by weight or over of phenol-based additive and 0.1 part by weight or over of silane-based additive (Embodiments 1 to 11) showed no generation of defective air-tightness even when the peak temperature is 270° C. during the test. Also, the electrolytic capacitors using a sealing member containing 0.05 part by weight or less of silane-based additive (Embodiment 12) increased in the number of defectives with respect to air-tightness with the lapse of time. Further, the electrolytic capacitors using a sealing member containing no phenol-based additive nor silane-based additive (Comparative example) more increased in the number of defectives with respect to air-tightness with the lapse of time.

In the high temperature elasticity test results of a cross-linked structure used as a sealing member of Table 4, the electrolytic capacitors using a sealing member containing 0.3 part by weight or over of phenol-based additive and 0.1 part by weight or over of silane-based additive (Embodiments 1 to 11) were less in lowering of elasticity at high temperatures as compared with the electrolytic capacitor using a sealing member containing 0.05 part by weight or less of silane-based additive (Embodiment 12). Further, the electrolytic capacitor using a sealing member containing no phenol-based additive nor silane-based additive (Comparative example) was greatest in lowering of elasticity at high temperatures.

As is apparent in the test results of Table 1 and Table 2, a sealing member made by cross-linking a compound containing silane-based additive has excellent sealing stress and moisture resistance. Also, a sealing member made by cross-linking a compound containing phenol-based additive suppresses the deterioration of the sealing member and maintains the sealing stress. Due to these effects, lowering of elasticity of the electrolytic capacitor may be suppressed, and as a result, the electrolytic solution for driving is prevented from volatilization. Thus, an electrolytic capacitor capable of maintaining the initial characteristics for a long period of time may be obtained.

As is apparent in the results of Table 3 and Table 4, a sealing member made by cross-linking a compound containing silane-based additive assures elasticity at high temperatures, and as a result, generation of mounting trouble may be prevented in the mounting process by reflow soldering onto a wiring board. Thus, it is possible to obtain an aluminum electrolytic capacitor having excellent reliability.

When the content of phenol-based additive is 0.5 part by weight or over as against 100 part by weight of butyl rubber polymer, the effects obtained as described above are excellent in particular. In case the content of phenol-based additive is less than 0.5 part by weight as against 100 part by weight of butyl rubber polymer, the above effects will be a little decreased.

When the content of silane-based additive is 0.1 part by weight or over as against 100 part by weight of butyl rubber polymer, the effects obtained as described above are excellent in particular. In case the content of silane-based additive is less than 0.1 part by weight as against 100 part by weight of butyl rubber polymer, the above effects will be a little decreased.

As for an aluminum electrolytic capacitor in an exemplary embodiment of an electronic component of the present invention, it is not limited to a chip type surface-mounted aluminum electrolytic capacitor, but applicable to an electrolytic capacitor having electrolytic solution as well. Further, the exemplary embodiment of an electronic component of the present invention is an example of an electrolytic capacitor having electrolytic solution, but as for the electronic component in the present invention, it is not limited to this type of electrolytic capacitor, but applicable to an electronic component comprising electrolytic solution filled in a case and a sealing member which seals the case.

As described above, by the configuration of the present invention, even in the long-time life test at high temperatures and the long-time life test under high-temperature high-humidity conditions, the sealing member will never be subjected to bad influences of the electrolytic solution for driving, and accordingly, lowering of elasticity of the sealing member is suppressed, thereby improving the air-tightness of the sealing member. Further, the electrolytic solution evaporated may be prevented from leaking out of the case. In this way, an electronic component having excellent reliability may be obtained. As a result, the life of the electronic component will be prolonged. In addition, when an electronic component of the present invention is mounted on a wiring board, generation of defective electronic component may be prevented even in reflow soldering with use of solder using no lead. Thus, it is possible to obtain an electronic component capable of maintaining excellent air-tightness for a long period of time in a high temperature atmosphere and under high-temperature high-humidity conditions. Further, even in mounting on a wiring board by reflow soldering, the electronic component obtained may assure excellent air-tightness.

What is claimed is:

1. An electronic component, comprising:
    a case having an opening;
    an electronic component element installed in said case;
    an electrolytic solution disposed in said case; and
    a sealing member disposed so as to seal the opening of said case,
    wherein said sealing member has elasticity and comprises a cross-linked structure of compound, and said compound contains butyl rubber polymer as main component, phenol-based additive, and silane-based additive.

2. The electronic component of claim 1,
    wherein said case is a metallic case which is cylindrical having a bottom.

3. The electronic component of claim 1,
    wherein the butyl rubber polymer is isobutylene isoprene polymer.

4. The electronic component of claim 1,
    wherein said phenol-based additive contains at least either one of phenol class and phenol derivative;
    said phenol class has substituents bonded to at least one selected from the group consisting of ortho position (o-), meta position (m-) and para position (p-) of phnol in chemical structure;
    each substituent has at least one selected from the group consisting of alkyl group, hydroxyl group and sulfhydryl group;
    said phenol derivative includes a plurality of phenol groups and intermediate groups respectively bonded between the respective phenol groups;
    said intermediate group has at least one selected from the group consisting of carbon, sulfur and alkyl group; and
    each phenol group is the similar chemical structure to the phenol.

5. The electronic component of claim 1,
    wherein said silane-based additive contains an organic silicon compound monomer;
    said organic silicon compound has a chemical structure including silicon, and organic group and hydrolysis group bonded to the silicon;
    said organic group includes at least one selected from the group consisting of carbon, nitrogen, oxygen, sulfur and hydrogen; and
    said hydrolysis group includes at least one selected from the group consisting of carbon, hydrogen, and chlorine.

6. The electronic component of claim 1,
    wherein said phenol-based additive contained is 0.5 part by weight or over against 100 part by weight of the butyl rubber polymer.

7. The electronic component of claim 1, wherein said silane-based additive contained is 0.1 part by weight or over against 100 part by weight of the butyl rubber polymer.

8. The electronic component of claim 1, wherein said electrolytic solution contains a solvent and electrolyte.

9. The electronic component of claim 8,
    wherein said solvent contains at least one selected from the group consisting of ethylene glycol, γ-butyrolactone, propylene carbonate, sulfolane, and water;
    said electrolyte contains at least one electrolyte salt out of organic acid and inorganic acid;
    said electrolyte salt contains at least one selected from the group consisting of ammonium salt, primary to quaternary ammonium salt, imidazolium salt, imidazolium, and their derivatives.

10. The electronic component of claim 1,
    wherein said compound further contains peroxide compound as a cross-linking catalyst; and
    said butyl rubber polymer is cross-linked by the action of the peroxide compound.

11. The electronic component of claim 1,
    wherein said compound further contains a cross-linking polymer that can be bridged to the butyl rubber polymer: and
    said cross-linking polymer and said butyl rubber polymer are bridged to each other.

12. The electronic component of claim 1,
    wherein said sealing member has elastic modulus of $4N/mm^2$ or over in a range from 240° C. to 270° C.

13. The electronic component of claim 1,
    wherein said electronic component element is an aluminum electrolytic capacitor element.

14. The electronic component of claim 1,
    wherein said electronic component is a chip type surface-mounted aluminum electrolytic capacitor.

15. The electronic component of claim 1,
    wherein said electronic component element comprises an aluminum electrolytic capacitor, and positive electrode lead wire and negative electrode lead wire electrically connected to said aluminum electrolytic capacitor element; and
    each end of said positive electrode lead wire and negative electrode lead wire is positioned on the same side of said case and can be surface-mounted on a wiring board.

16. The electronic component of claim 15, further compring
    an insulating member disposed in the case;
        wherein said case is made of metal;
        said case has an inner bottom formed at a position opposite to said opening; and
        said insulating member is located between the inner bottom and the capacitor element.

17. The electronic component of claim 1,
    wherein said electronic component further comprises positive electrode lead wire and negative electrode lead wire electrically connected to said electronic component element; and
    said positive electrode lead wire and said negative electrode lead wire go through the sealing member and extend out of the sealing member.

* * * * *